United States Patent [19]

Merrill

[11] 3,925,276

[45] Dec. 9, 1975

[54] ORGANOPOLYSILOXANE RELEASE RESINS USEFUL IN COOKING AND BAKING PROCESSES

[75] Inventor: Duane F. Merrill, Ballston Spa, N.Y.

[73] Assignee: General Electric Company, Waterford, N.Y.

[22] Filed: Sept. 16, 1974

[21] Appl. No.: 505,988

Related U.S. Application Data

[63] Continuation-in-part of Ser. No. 115,715, Feb. 16, 1971, abandoned, which is a continuation-in-part of Ser. No. 798,187, Feb. 10, 1969, abandoned, which is a continuation-in-part of Ser. No. 671,574, Sept. 29, 1967, abandoned.

[52] U.S. Cl. .............. 260/18 S; 117/97; 117/124 R; 117/132 BS; 260/31.2 R; 260/32.8; 260/33.2 SB; 260/33.6 SB; 260/46.5 G; 260/448 ZE
[51] Int. Cl.² ......................................... C08L 91/00
[58] Field of Search ... 260/46.5 R, 448.2 E, 46.5 G, 260/18 S, 33.6 SB, 33.2 SB

[56] References Cited

UNITED STATES PATENTS

| | | | |
|---|---|---|---|
| 3,450,672 | 6/1969 | Merrill | 260/46.5 R |
| 3,489,782 | 1/1970 | Pruvost et al. | 260/46.5 R |
| 3,759,867 | 9/1973 | Merrill | 260/46.5 R |
| 3,786,015 | 1/1974 | Merrill | 260/46.5 R |
| 3,790,527 | 2/1974 | Merrill | 260/46.5 R |

*Primary Examiner*—Melvin I. Marquis
*Attorney, Agent, or Firm*—E. Philip Koltos, Esq.; George B. Finnegan, Jr.; Rocco S. Barrese

[57] ABSTRACT

Silanol containing organopolysiloxane resins, especially useful as release resins, prepared by the acetonewater hydrolysis of an organohalosilane blend consisting essentially of about 60 mole percent methyltrichlorosilane, 35 mole percent phenyltrichlorosilane and about 5 mole percent dimethyldichlorosilane, are provided. Cooking utensils, particularly baking utensils coated with the same are also provided.

18 Claims, No Drawings

ORGANOPOLYSILOXANE RELEASE RESINS USEFUL IN COOKING AND BAKING PROCESSES

RELATED APPLICATIONS

This application is a continuation-in-part of copending application Ser. No. 115,715, filed Feb. 16, 1971, now abandoned which, in turn, is a continuation-in-part of application Ser. No. 798,187, filed Feb. 10, 1969 and now abandoned, which, in turn, is a continuation-in-part of application Ser. No. 671,574, filed Sep. 29, 1967 and now abandoned.

BACKGROUND OF THE INVENTION

This invention relates to organopolysiloxane resins and more particularly to organopolysiloxane resins useful as release coatings, particularly in the preparation of cooked and baked goods, especially sweet baked goods.

With the advant of automation, the baking industry has become increasingly more dependent upon silicone release resin coated baking utensils. In addition to providing for the easy release of the baked product from the utensil, such as a bread pan, the release coating serves as a protection against rusting and pitting and also provides for a sanitary baking surface. Moreover, when a set of pans needs servicing by a reglazer, the old coating is generally easily removed with a caustic potash solution.

In the past, however, available silicone release resinss have been found to be quite unsatisfactory, particularly in the baking of sweet goods. The high sugar content in sweet goods, such as cakes, pastries, sweet breads and the like, rapidly destroys the release properties of these prior art silicone coatings.

SUMMARY OF THE INVENTION

Accordingly, it is one object of this invention to provide a novel organopolysiloxane release coating resin.

Another object of this invention is to provide an organopolysiloxane release coating resin which is particularly suitable for use in cooking and baking processes.

Still another object of this invention is to provide an organopolysiloxane release coating resin which is resistant to attach and degradation by sugar and thus especially well suited for use when baking sweet goods.

Another object of this invention is to provide a novel process for providing release properties to cooking utensils, especially baking utensils.

A still further object of this invention is to provide cooking utensils, particularly baking utensils, which are coated with the novel organopolysiloxane release resins of this invention.

These and other objects are accomplished herein by providing aa silanol-containing organopolysiloxane resin prepared by the process comprising the steps of:

i. agitating a mixture comprising (A) an organohalosilane blend consisting essentially of about 60 mole percent methyltrichlorosilane, about 35 mole percent phenyltrichlorosilane, and about 5 mole percent dimethyldichlorosilane, (B) water, (C) acetone, and (D) a water-immiscible organic solvent, wherein there is present by weight in said mixture per part by weight of (A), 1.7 to 10 parts of (B), 0.2 to 5 parts of (C) and 0.3 to 5 parts of (D); and ii. separating the organic solvent solution of (F) from the resulting hydrolysis mixture of step (i), wherein (F) is a silanol-containing organopolysiloxane resin having an average ratio of about 1.05 organo radicals per silicon atom.

DETAILED DESCRIPTION OF THE INVENTION

In copending application U.S. Ser. No. 115,715, filed Feb. 16, 1971, now abandoned there is disclosed a broad class of novel fast curing silanol-containing organopolysiloxane resins. It has now been surprisingly discovered that a narrow resin composition within this broad class of resins is particularly well suited as a release resin coating for cooking and baking utensils, such as frying pans, pots, bread pans, cookie and pastry sheets, oven trays, etc. It has been discovered that this narrow resin composition is highly resistant to attack by charred sugar and thus is particularly well suited as a release resin in baking processes involving sweet goods.

Thus, the silicone release resin of this invention is prepared by hydrolyzing an organohalosilane blend consisting essentially of about 60 mole percent methyltrichlorosilane, about 35 mole percent of phenyltrichlorosilane and about 5 mole percent of dimethyldichlorosilane in the presence of water, acetone and a water-immiscible organic solvent. In general, this hydrolysis medium contains from about 1.7 parts to 10 parts of water, 0.2 to 5 parts of acetone and 0.3 to 5 parts of said water-immiscible organic solvent per part by weight of the silane blend.

The various components of the hydrolysis mixture can be added concomitantly or separately in any desired order. Generally, the organohalosilanes are added to the mixture of water, acetone and organic solvent. Preferably, when this method is used a proportion of from 2 to 6 parts of water, about 0.3 to about 2 parts of acetone, and about 0.6 to about 2 parts of organic solvent, per part of the total weight of organohalosilane blend, is employed. It is preferred that the organohalosilanes are added to the hydrolysis medium, rather then vice versa, as this limits the concentration of hydrochloric acid which is formed during the hydrolysis reaction. A strong hydrochloric acid solution is undesirable as the hydrochloric acid causes acid polymerization of the acetone forming polymerization products which add undesirable color to the product and have a deleterious effect on the physical properties of the product.

A preferred method to prepare the organopolysiloxane release resins of this invention is the dual feed process. The dual feed process comprises feeding the blend of organohalosilanes (A) and from about 0.9 to 5 parts, preferably 0.9 to 1.2 parts of acetone (C) from separate containers and through separate conduits, then premixing them immediately prior to hydrolysis. It is necessary to limit the contact time if small amounts of water are present in the acetone or in the atmosphere in contact with the organohalosilanes, as the water present causes hydrolysis of the organohalosilanes generating acid which causes the acetone to polymerize. The initial hydrolysis medium prior to the introduction of the silane blend-acetone mixture contains from about 0 to 4.1 parts of acetone (C), preferably from 0.9 to 1.2 parts of acetone (C). The amount of water (B) and organic solvent (D) can be as set forth hereinabove, with preferably from about 3 to 3.5 parts of water (B) and 0.9 to 1.2 parts of organic solvent (D) per part of the total weight of the blend of organohalosilanes.

The temperature of the hydrolysis mixture can be controlled by the rate of addition of the reagents, or by external heat or by cooling if desired. During hydrolysis, a temperature of between about 20°C to about 40°C is preferred. After the addition of all the reagents is completed, the mixture is generally agitated for an additional period of time such as 15 to 30 minutes or more to allow for complete hydrolysis of the organohalosilanes. The mixture is then allowed to settle and the acid aqueous (bottom) layer is drawn off from the organic layer. Depending upon individual desires, the organic layer can then be stripped of solvent to a solids concentration of up to 100%. The organic solvent may be stripped under reduced pressure of atmospheric pressure. At this point, the resin may be bodied, i.e., buildup of molecular weight, under total reflux, by condensing and cross-linking silanol units, with the aid of, for example, a catalyst such as iron octoate or Celite (diatomaceous earth) or mixtures thereof, to a desired viscosity, preferably 5–12 cps. at 25°C at 20 % by weight resins solids. Moreover, resin impurities may be removed by filtration, using, for example, filtering aids, such as Celite 545 (diatomaceous earth, sold by Johns Manville), Fuller's earth (calcium montmorillonite), and mixtures of the same, or simply by centrifugation. The resulting silanol-containing organopolysiloxane resin has an organo radical to silicon ratio of about 1.05 to 1.

Included among the water-immiscible organic solvents used in the practice of this invention are, for example, hydrocarbons such as benzene, toluene, xylene and the like; esters such as butyl acetate, ethyl acetate, ethers such as diethylether and the like. Toluene is most preferred. In general, however, any water-immiscible organic solvent, which is inert to the hydrolysis reactants during hydrolysis and in which the hydrolyzate is soluble to provide for its separation from the aqueous layer, may be used.

In another embodiment of the present invention the silanol-containing organopolysiloxane resin of the present invention, as described hereinabove, is readily formulated into a desirable release resin coating mixture. In doing so, the organopolysiloxane resin is merely admixed with conventional solvents, curing catalysts, silicone fluids, film-forming aids, etc. Resulting from their primary intended use in food cooking and baking processes, it is preferred, of course, that these release resin formulation components be acceptable food contact additives. Thus, suitable solvents include, for example, toluene, xylene and the like; suitable silicone fluids include, for example, conventional fluids which are generally mixtures of methylphenylsiloxanes, dimethylsiloxanes and/or diphenyldimethylsiloxanes. As acceptable curing catalyst is, for example, iron octoate. Film-forming aids which are suitable for the purposes of this invention include, for example, glycol ethers, such as butyl Cellosolve (ethylene glycol monobutylether), naphtha, ketones, acetates and the like and mixtures thereof. Other film-forming aids would, of couse, include any organic solvent of sufficient volatility and stability to aid in the formation of a film.

The amounts of the materials which are employed in these release resin formulations may vary within wide limits. In general, however, the organopolysiloxane resin is employed in an amount ranging from about 15 to about 30 percent of the total formulation, preferably about 20 percent. The organosilicone fluids, such as those described hereinabove, generally comprise from about 1 to 3%, while the curing catalyst is present in amounts which can vary, for example, from about 0.03 to about 1.8%, preferably about 0.06%, based upon the resin solids content. The amount of other additives generally employed, such as film-forming additives, can also vary within wide limits, depending upon individual requirements, and such amounts are readily ascertainable by those of ordinary skill in the art.

In another embodiment of this invention, the organopolysiloxane release resin coating mixtures described above are readily applied by conventional techniques, such as spraying, dipping, brushing, etc., on the food contact surface or surfaces of, for example, glass, ceramic or metal cooking and baking utensils such as frying pans, pots, bread pans, oven trays, cookie sheets, toaster oven trays and the like. Simply heat curing these organopolysiloxane release resin coatings, after application, provides the cooking or baking utensils with not only a highly sugar-resistant coating but moreover a coating which is highly solvent-resistant in addition to being resistant to grease and fats. The thickness of the coating necessary to provide the desired release properties varies and is generally from about 0.035 to 0.5 mils.

In order that those skilled in the art may better understand how to practice the present invention, the following examples are given by way of illustration and not by way of limitation. All parts are by weight.

EXAMPLE I

This example illustrates the preparation of a silanol-containing organopolysiloxane release resin and release resin coating mixture according to this invention.

There are charged to a reaction flask equipped with a condenser, agitator and thermometer, 3000 parts of water, 900 parts of toluene and 900 parts of acetone. There are added to the mixture in the reaction flask in a dual feed with 900 parts of acetone through a common dip leg, a silane blend consisting of 526 parts of methyltrichlorosilane, 436 parts of phenyltrichlorsilane, and 38 parts of dimethyldichlorosilane. The rate of addition is controlled for 30 minutes maintaining the peak reaction temperature below 45°C. The mixture is stirred for 15 minutes, and allowed to settle for 15 minutes. The acid water (bottom) layer is drawn off and discarded. Ten percent water based on resin solids is charged to the resin layer and the mixture is agitated for 5 minutes, and settled for 15 minutes. The excess water is drawn off and discarded. The washed hydrolyzate is filtered through a mixture of Celite 545 and Fuller's earth. The filtered hydrolyzate is atmospherically stripped to 120°C. One percent Celite 545 based on resin solids is added to the resin concentrate and the solvent is stripped off to 140°C total reflux. The condensate is trapped off and the resin is bodied at about 160°C in the presence of iron octoate to an endpoint to give a final viscosity of 9–12 centipoise (cps) at 25°C on an LVF Brookfield Viscometer at 20% solids.

A release resin solution is made from the above organopolysiloxane resin as follows:

| | |
|---|---|
| Resin dissolved in equal parts of xylene | 160 parts |
| Xylene | 84 " |
| Butyl Cellosolve | 32 " |
| Naphtha 9300 (available from Union Amsco, California) | 120 " |
| Iron Octoate | 0.8 " |
| General Electric silicone fluid 81950 (a mixture of methylphenylsiloxanes, dimethylsiloxanes and diphenyl | |

| | |
|---|---|
| dimethyl siloxanes) | 3.7 |

A tin coated steel cup is flood-coated with the resin solution and air-dried for 30 minutes. The cup is placed on a preheated 425°F oven for 1 hour. After cooling, a sugar cube is placed in the cup and wet with 25 drops of water. The cup is placed in a 425°F oven for 45 minutes. The cup is cooled to room temperature and checked for release of the charred sugar. The charred sugar does not adhere to the resin coating.

For comparative purposes, silanol-containing organopolysiloxane resins and release resin coating mixtures are prepared according to Examples II-V.

EXAMPLE II

There is charged to a reaction flask equipped with a condenser, agitator, and thermometer 6000 parts of water, 1350 parts of acetone, and 1350 parts of toluene. There is added to the mixture in the reaction flask in a dual feed with 1350 parts of acetone through a common dip leg 1500 parts of phenyltrichlorosilane. The rate of addition is controlled for 20 minutes, controlling the peak reaction temperature below 40°C. The mixture is stirred for 15 minutes and settled for 15 minutes. The acid water (lower) layer is drawn off and discarded. The solvent is removed under reduced pressure to 55-65% resin solids. The hydrolyzate concentrate is filtered through a mixture of diatomaceous earth and Fuller's earth. The filtered concentrate is further stripped under reduced pressure to 95-100% solids. The hot melt is cast and cooled in a tray. Upon cooling, the resin is solid and friable.

A release resin solution is made from the above resin as follows:

| | | |
|---|---|---|
| Resin dissolved in equal parts of xylene | 160 | parts |
| Xylene | 84 | " |
| Butyl Cellosolve | 32 | " |
| Naphtha 9300 | 120 | " |
| Iron Octoate | 0.8 | " |
| General Electric 81950 silicone fluid | 3.7 | " |

A tin coated steel cup is flood-coated with the resin solution, air-dried 30 minutes. The cup is placed in a preheated 425°F oven for 1 hour. After cooling, a sugar cube is placed in the cup and wet with 25 drops of water. The cup is placed in a 425°F oven for 45 minutes. The cup is cooled to room temperature and checked for release of the charred sugar. The charred sugar sticks tenaciously to the silicone coating. It cannot be removed without destroying the coating.

EXAMPLE III

There is charged to a flask equipped with a condenser, agitator and thermometer 3000 parts of water, 900 parts of toluene, and 900 parts of acetone. There is added to the mixture in the reaction flask a silane blend consisting of 414 parts of methyltrichlorosilane and 586 parts of phenyltrichlorosilane in a dual feed through a common dip leg with 900 parts of acetone. The rate of addition is controlled for 30 minutes, controlling the peak reaction temperature below 50°C. The mixture is agitated for 15 minutes, settled for 15 minutes. The acid water (bottom) layer is drawn off and discarded. Ten percent water based on resin solids is added to the hydrolyzate and the mixture is agitated for five minutes. The water and solvent are removed under reduced pressure to 55-70% solids concentrate. The resin concentrate is filtered through a mixture of Celite 545 and Fuller's earth. The remaining solvent is removed under reduced pressure to 130°C and 98-100% solids. The hot melt is cast in a tray and cooled. Upon cooling, the resin is hard and friable. A release resin solution is made from the resin and tested as outlined in Example II. The charred sugar cannot be removed without destroying the resin film.

EXAMPLE IV

A silanol-containing organopolysiloxane resin and release resin coating mixture is made, as described in Example II, from all methyltrichlorosilane. The resin coating mixture is tested for sugar resistance as in Example II. The sugar cannot be removed without destroying the resin film.

EXAMPLE V

A silanol-containing organopolysiloxane resin and release resin coating mixture is made, as described in Example II, from a 50% by weight blend of diphenyldichlorosilane and 50% by weight of dimethyldichlorosilane. The resin coating mixture is tested for sugar resistance as in Example II. The sugar cannot be removed without destroying the resin film.

From the above Examples, it is clearly seen that only the silanol-containing organopolysiloxane release resin of Example I is resistant to sugar degradation.

Obviously, other modifications and variations of the present invention are possible in light of the above teachings. It is therefore to be understood that changes may be made in the particular embodiments of this invention which are within the full intended scope of the invention as defined by the appended claims.

What is claimed and desired to be secured by Letters Patent is:

1. A silanol-containing organopolysiloxane resin prepared by the process comprising the steps of
   i. agitating a mixture comprising (A) an organohalosilane blend consisting essentially of about 60 mole percent methyltrichlorosilane, about 35 mole percent phenyltrichlorosilane, and about 5 mole percent dimethyldichlorosilane, (B) water, (C) acetone, and (D) a water-immiscible organic solvent, wherein there is present by weight in said mixture per part by weight of (A), about 1.7 to about 10 parts of (B), about 0.2 to about 5 parts of (C), and about 0.3 to about 5 parts of (D); and
   ii. separating the organic solvent solution of (F) from the resulting hydrolysis mixture of step (i), wherein (F) is a silanol-containing organopolysiloxane resin having an average ratio of about 1.05 organo radicals per silicon atom.

2. A silanol-containing organopolysiloxane resin prepared according to claim 1, said water (B) being present in an amount of from about 2 to about 6 parts, said acetone (C) being present in an amount of from about 0.3 to about 2 parts, and said water-immiscible solvent (D) being present in an amount of from about 0.6 to about 2 parts, per part by weight of said organohalosilane blend (A).

3. A silanol-containing organopolysiloxane resin prepared according to claim 1 wherein said water-immiscible organic solvent is toluene.

4. A silanol-containing organopolysiloxane resin prepared according to claim 1, wherein component (F) is bodied to a desired viscosity of from about 5-12 centipoise at 25°C at 20% by weight resins solid.

5. A silanol-containing organopolysiloxane resin prepared according to claim 2 wherein said water-immiscible organic solvent is toluene.

6. A silanol-containing organopolysiloxane resin prepared according to claim 1 wherein said organohalosilane blend (A) is premixed with from about 0.9 to about 5 parts by weight of acetone immediately prior to hydrolysis in the remainder of the hydrolysis mixture comprising from about 0 to 4.1 parts of acetone (C), about 1.7 to about 10 parts water (B), and from about 0.3 to about 5 parts water-immiscible organic solvent (D).

7. A silanol-containing organopolysiloxane resin prepared according to claim 6 wherein said organohalosilane blend (A) is premixed with from about 0.9 to 1.2 parts of acetone (C) immediately prior to hydrolysis in the remainder of the hydrolysis mixture comprising from about 0.9 to about 1.2 parts of acetone (C), from about 3 to about 3.5 parts water (B) and from about 0.9 to 1.2 parts of water-immiscible organic solvent (D).

8. A silanol-containing organopolysiloxane resin prepared according to claim 6 wherein said water-immiscible organic solvent is toluene.

9. A silanol-containing organopolysiloxane resin prepared according to claim 7 wherein component (F) is bodied to a desired viscosity of from about 5–12 centipoise at 25°C at 20% by weight resins solid.

10. A silanol-containing organopolysiloxane resin prepared according to claim 8 wherein component (F) is bodied to a desired viscosity of from about 5–12 centipoise at 25°C at 20% by weight resins solid.

11. A silanol-containing organopolysiloxane resin prepared according to claim 9 wherein said water-immiscible organic solvent is toluene.

12. A silanol-containing organopolysiloxane release resin coating mixture comprising the silanol-containing organopolysiloxane resin of claim 1 and a material selected from the group consisting of an organic solvent, an organosilicone fluid, a film-forming aid, a curing agent and mixtures thereof.

13. A silanol-containing organopolysiloxane release resin coating mixture comprising the silanol-containing organopolysiloxane resin according to claim 2 and a material selected from the group consisting of an organic solvent, and organosilicone fluid, a film-forming aid, a curing agent and mixtures thereof.

14. A silanol-containing organopolysiloxane release resin coating mixture comprising the silanol-containing organopolysiloxane resin according to claim 4 and a material selected from the group consisting of an organic solvent, an organosilicone fluid, a film-forming aid, a curing agent and mixtures thereof.

15. A silanol-containing organopolysiloxane release resin coating mixture comprising the silanol-containing organopolysiloxane resin according to claim 6 and a material selected from the group consisting of an organic solvent, an organosilicone fluid, a film-forming aid, a curing agent and mixtures thereof.

16. A silanol-containing organopolysiloxane release resin coating mixture comprising the silanol-containing organopolysiloxane resin according to claim 7 and a material selected from the group consisting of an organic solvent, an organosilicone fluid, a film-forming aid, a curing catalyst and mixtures thereof.

17. A silanol-containing organopolysiloxane release resin coating mixture comprising the silanol-containing organopolysiloxane resin according to claim 8 and a material selected from the group consisting of an organic solvent, an organosilicone fluid, a film-forming aid, a curing catalyst and mixtures thereof.

18. A silanol-containing organopolysiloxane release resin coating mixture comprising the silanol-containing organopolysiloxane resin of claim 11, xylene, an organosilicone fluid comprising a mixture of methylphenylsiloxanes, dimethylsiloxanes and diphenylmethysiloxanes, naphtha, ethylene glycol monobutylether and iron octoate.

* * * * *